Figure 2:
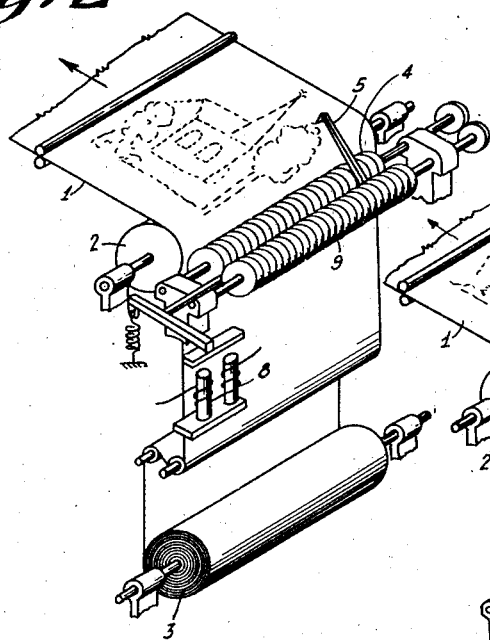

May 9, 1933.  H. RUDOLPH  1,907,881

PICTURE TELEGRAPH APPARATUS

Filed Oct. 8, 1930

INVENTOR
HANS RUDOLPH

BY

ATTORNEY

Patented May 9, 1933

1,907,881

UNITED STATES PATENT OFFICE

HANS RUDOLPH, OF BERLIN-CHARLOTTENBURG, GERMANY, ASSIGNOR TO SIEMENS & HALSKE, AKTIENGESELLSCHAFT, OF SIEMENSSTADT NEAR BERLIN, GERMANY, A CORPORATION OF GERMANY

PICTURE TELEGRAPH APPARATUS

Application filed October 8, 1930, Serial No. 487,119, and in Germany September 6, 1929.

Picture-telegraph apparatus, especially those comprising chemographic picture recording means, have preferably been furnished with a T-screw shaped electrode blade or edge for secondary picture decomposition or scanning, while primary picture scanning has usually been effected by continuous or intermittent conveyance of the picture support. This form of construction has been adopted for the reason that the screw spindle formerly extensively used for secondary picture scanning with a pin or stylus disposed thereon, failed to satisfy requirements as regards reliable reciprocal motion. The means to insure return or restoration comprising such a screw spindle or worm consisted in cutting the screw spindles for forward and backward movement with two spires, and in providing reversing means in order to cause the guide pin to come into engagement with the retrogressive spires after completion of the forward stroke. To make sure that the guide pin would be reversed only after it had reached the end of the spindle, separate control rods were provided intended to turn the guide blade or edge a certain amount. Arrangements of this kind are quite satisfactory when the scanning rate is comparatively low; but they fail to give satisfaction as soon as the recording speed is raised.

An arrangement which is also suitable for high recording speeds as hereinafter to be disclosed is characterized by the feature that the exploring electrode is guided or conveyed by the spindle in one direction, and, as it reaches the end of a line, it is caused to disengage with the spindle, and is returned independently thereof. The return motion may be expedited by means of a retractile spring or by the agency of a distinct retrogressive spindle. One essential feature of the invention moreover consists in locating the scanning electrode with the part engaging in the spindle upon a pivotal guide rod or the like, where motion is preferably impact-type or blow-like in order that the lifting may be effected as rapidly as feasible, and in order to prevent damaging of the guide-spindle spires or threads. The latter point is particularly important on the ground because, if the electrode is returned at a higher rate of velocity, the screw threads are liable to be damaged. The lifting of the electrode may be effected mechanically or else electromagnetically. Return motion may be accomplished by the provision of a distinct retrogressive spindle with which the electrode or the conveyor link thereof can be caused to engage upon the return motion.

The arrangement disclosed by this specification makes it possible to build the electrode and other mobile parts in such a way that they will involve but little inertia, so that disturbance and trouble in actual operation need not be feared on this score.

Figure 1:
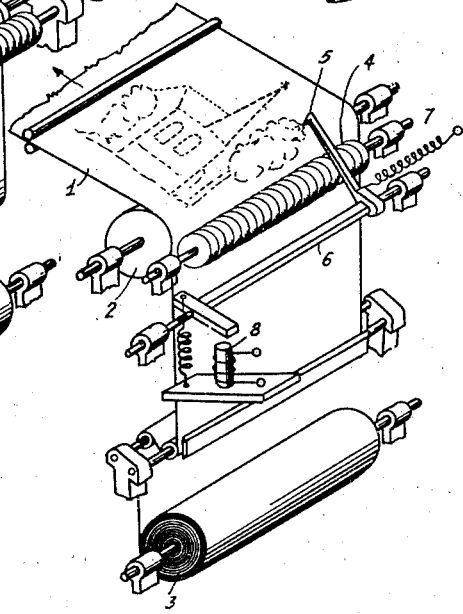
Figure 3:
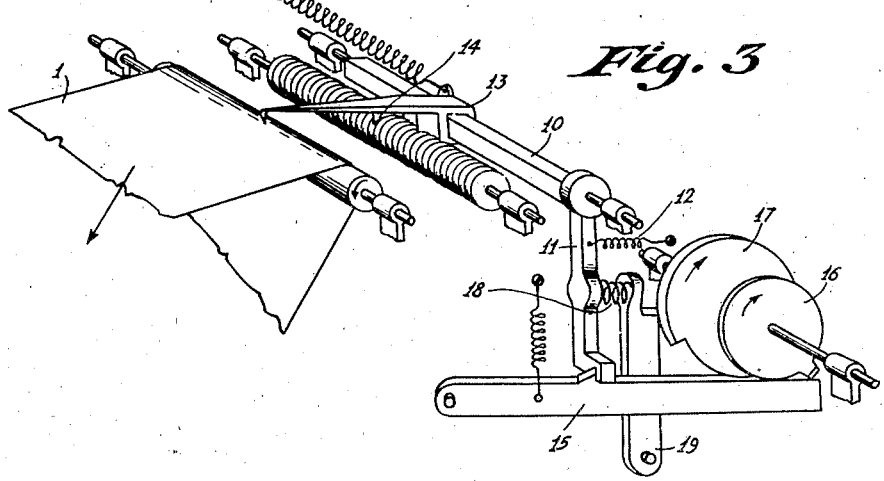

The accompanying drawing illustrates embodiments, by way of example, of the invention; wherein, Fig. 1 shows one form of system by which a spring mechanism has been provided for moving the scanning electrode across the record surface in one direction for the return motion thereof;

Fig. 2 shows a modified form of the invention wherein a separate return spindle has been provided to move the scanning element; and, Fig. 3 relates a modification of the invention illustrated by Figs. 1 and 2.

Referring now to the drawing, and first to Fig. 1 thereof, 1 is the paper strip which has been chemically prepared or impregnated. The paper strip 1 is advanced at a constant rate in the direction shown by the arrow by the agency of the rollers 2 and 3. In front of the roller 2 is the spindle 4 which is suitably rotated at a constant rate of speed. In engagement with the threads of the spindle is the scanning electrode 5. The engaging part may consist of a blade, a blade roll or a female lock so that the electrode is conveyed along the metal bar 6 by the spindle, incidentally scanning the paper tape 1. The current is supplied at points $a$ and $b$. While the scanning work proceeds, the retractile spring 7 is tensioned so that, say, by a contact stop or by a start-stop impulse the magnet 8 becomes energized and thereby causes the pivotal guide rod to be turned again with the result that the electrode 5 is again caused to disengage with the spindle. As soon as the electrode is out of engagement it is rapidly returned to the original position by the retractile spring and caused to re-engage by back-impact of the guide rod 6.

Fig. 2 illustrates the use of a distinct return spindle 9 which, if desired, may be designed with a larger pitch or may be rotated at a higher rate of speed than the spindle 4. The scanning electrode is here caused to engage through its clutch or coupling with the return spindle, being re-coupled with the scanning spindle 4 after the return stroke has been completed.

Fig. 3 illustrates a special embodiment of the lifting means designed so as to effect this operation as expeditiously as feasible.

The guide bar 10 has at its end a lever 11 where a pull spring 12 engages and which at the beginning of a picture line so turns the guide bar that the blade 14 secured on the carriage 13 comes to engage with the forward feed spindle. The lug of the pawl lever 15 then locks the lever 11 until the picture line has been completed. The spindle on which are supported a cam disk 16 and an eccentric 17 rotates one turn during one picture line, and in the meanwhile the heavy compression spring 18 being of limited stroke is tensioned by the eccentric 17. When the picture line is completed, the cam disk 16 releases the pawl lever 15 with the result that the lever 11 under the pressure of spring 18 describes a small angle. Thereby the stylus is lifted clear of the paper, the blade 14 ceases to be engaged, and the return of the slide 13 is caused. As the eccentric 17 is turned still further the pressure of the spring 18 ceases by the engagement of the lever 19 so that at the beginning of a new line of the picture, lever 11 by the pull of spring 12 is turned back again. The cam of disk 16 during the return stroke of the slide has traveled past the pawl lever 15 so that the lug is now able again to come into engagement and lock and secure the lever 11 against premature raising of the stylus.

Having now described my invention, what I claim and desire to secure by Letters Patent is the following:

1. In a picture telegraph apparatus, a pivotally mounted scanning electrode, a recording surface, means for moving the recording surface continuously relative to the electrode, means for causing the scanning electrode to traverse the recording surface due to the relative motion between the recording surface and the electrode along a series of paths transverse to the recording surface for producing markings thereon, electromagnetic means operable at the end of each transverse stroke of the scanning electrode across the record surface in one direction for moving the electrode on the pivotal mounting so as to disengage the electrode from the recording surface and means for returning the scanning electrode to a starting position relative to the recording surface while in a disengaged position.

2. In a picture telegraph apparatus, a scanning stylus, a record surface means for moving the record surface continuously relative to the stylus means for causing the said stylus to traverse a record surface in operative relationship thereto in one direction for producing recordings on the record surface, elctromagnetic means for causing the stylus to become disengaged from the record surface after each traversal in said direction so as to cause said stylus to become inoperative for recording, and means for moving the stylus transverse to the said record surface in opposite direction from the path of recording while maintaining said inoperative position at a rate of speed substantially greater than the speed of traversal during recording.

In testimony whereof I affix my signature.
HANS RUDOLPH.